United States Patent
Wu

(10) Patent No.: US 6,262,192 B1
(45) Date of Patent: Jul. 17, 2001

(54) INTRODUCING A CONDENSING AGENT INTO A FLUIDIZED BED POLYMERIZATION REACTOR OPERATED IN THE CONDENSING MODE

(75) Inventor: Wenqing Wu, Tianjin (CN)

(73) Assignees: China Petrochemical Corporation, Beijing; Tianjim United Chemical Corporation, Tianjin, both of (CN)

( * ) Notice: Subject to any disclaimer, the term of this patent is extended or adjusted under 35 U.S.C. 154(b) by 0 days.

(21) Appl. No.: 09/643,776

(22) Filed: Aug. 22, 2000

(30) Foreign Application Priority Data

Aug. 30, 1999 (CN) .............................. 99 1 18185

(51) Int. Cl.[7] ...................................... C08F 2/34
(52) U.S. Cl. ................. 526/67; 526/68; 526/70; 526/87; 526/88
(58) Field of Search .................. 526/68, 70, 67, 526/87, 88

(56) References Cited

U.S. PATENT DOCUMENTS

| | | | | |
|---|---|---|---|---|
| 4,543,399 | * | 9/1985 | Jenkins, III et al. | 526/70 |
| 4,588,790 | | 5/1986 | Jenkins, III et al. | 526/70 |
| 6,075,101 | * | 6/2000 | Lynn et al. | 526/86 |

* cited by examiner

*Primary Examiner*—David W. Wu
*Assistant Examiner*—William Cheung
(74) *Attorney, Agent, or Firm*—Jenkens & Gilchrist, a Professional Corporation

(57) ABSTRACT

The present invention provides a polymerization process for producing polymers in a continuous gas phase fluidized bed reactor, wherein a recycle stream is allowed to cool down to below its dew point and the resultant two-phase mixture of the gas and liquid phases is recycled to the reactor, the inert condensable agent introduced into the recycle stream to raise the dew point being saturated hydrocarbons, characterized in that the saturated hydrocarbon is cyclopentane.

1 Claim, No Drawings

INTRODUCING A CONDENSING AGENT INTO A FLUIDIZED BED POLYMERIZATION REACTOR OPERATED IN THE CONDENSING MODE

FIELD OF THE INVENTION

The present invention relates to the improvement of a fluidized bed polymerization reactor, in particular, it relates to the improvement of a fluidized bed polymerization reactor operated in the condensing mode, i.e., the optimization of the condensing agent introduced into the reactor.

BACKGROUND ART

When an exothermic polymerization reaction is conducted using a fluidized bed reactor, the reaction rate is to be restricted so as to have time enough for removing the released heat from the fluidized bed. A method to raise the removal rate of the reaction heat is to compress and cool the gas that is in a monomer state and is to be recycled back to the reactor, so that it is partially condensed. The condensed liquid is entrained by the recycle monomer gas stream and returned to the reactor together with the gas stream. This operation is referred to as "condensing mode" operation method of polymerization reaction.

It has long been recognized that the temperature of the recycle gas stream could not be lower than the dew point of the recycle gas stream. The dew point is a temperature at which liquid condensate begins to form in the gas stream. It is believed that the introduction of liquid into a gas phase fluidized bed reactor would inevitably result in plugging of the recycle lines, the heat exchanger and the distribution plate below the fluidized bed; non-uniformity of the monomer concentration inside the fluidized bed; and accumulation of liquid at the bottom, which would affect the continuous operation, even result in a complete shut down of the reactor, and in an extreme case, result in a collapse of the bed and deposition of the solid particle into a solid mass.

U.S. Pat. Nos. 4,543,399 and 4,588,790 issued to Jenkins, III et al. disclose that the "condensing mode" operation will not cause plugging and other problems affecting the continuous operation, but on the contrary permits a marked increase in the space-time-yield. This mode of operation enables both a reduction in the recycle gas stream temperature and absorption of heat, because of the evaporation of the liquid. The combination of the two functions allows much higher space-time-yields in this mode than that in the non-condensing mode.

UCC, Chinese Patent Application No. 85106978 points out that when condensing operation is conducted, the dew point of the recycle gas is intentionally raised so that the heat removal is further enhanced. One method is to increase the concentration of the condensable gas in the recycle gas stream. For example, a condensable gas inert to the catalyst, reactant and polymerization reaction product may be introduced into the recycle gas stream, thereby the dew point of the recycle gas stream is raised. The said gas introduced into the recycle gas stream may be introduced together with the supplementary gas or introduced using any other means or at any other position of the system. Examples of the condensable gas are saturated hydrocarbons including butane, pentane or hexane etc. Chinese Patent Application No. 93105791,4 to Exxon Chemical Co., further provides examples of volatilizable liquid hydrocarbons in a broader range as the condensing agent,: those selected from saturated hydrocarbons with 2–8 carbon atoms, such as propane, n-butane, iso-butane, n-pentane, iso-pentane, neopentane, n-hexane, iso-hexane and other saturated $C_6$ hydrocarbons, n-heptane, n-octane and other $C_7$ and $C_8$ alkanes or the mixture thereof, among which $C_5$ and $C_6$ are preferred. Iso-pentane or n-hexane is selected in the examples, the construction of iso-pentane being 10.5 mole %.

In the prior arts operating in the condensing mode, only linear or branched saturated alkanes are disclosed to be selected as inert condensing agents with iso-pentane or n-hexane being preferred. It has never been disclosed that cycloalkanes can be selected as inert condensing agents. However, linear or branched alkanes have some intrinsic disadvantages.

If iso-pentane is used as the condensing agent, an amount of over 8 vol % has to be introduced into the recycle gas stream to achieve a desired space-time-yield due to the relatively light molecular weight, low boiling point, and small potential vaporization heat, and therefore the loss is rather great in the practical application because the content of iso-pentane in the gas phase is high. Taking another example wherein n-hexane is used as the condensing agent, because of the relatively heavy molecular weight and high boiling point, vicious accidents such as sticking, agglomeration of the resin, etc., will occur if its content in the recycle gas exceeds 6 vol % and the content of the liquid phase exceeds 20 wt % after condensation, thus the production has to be stopped for a treatment. What's more, n-hexane is rather difficult to be removed from the resin in the down stream treatment.

Through many times of comparative experiments, the inventors have surprisingly found that selection of cyclopentane as the condensing agent is more suitable for the condensing operation production in the fluidized bed polymerization reactor. Cyclopentane has the following advantages over iso-pentane:

The molecular weight approximately equals that of iso-pentane, but the vaporization heat is 25% greater than that of iso-pentane, i.e., the space-time-yield may be increased by 25% for the same amount of condensing agents.

The boiling point of cyclopentane at the normal pressure is 46° C., while the pressure is 2500–2560 kPa and the temperature is 36–52° C. at the reactor inlet. If the concentrations of both condensing agents are 4 vol %, the dew point of the recycle stream is 47.09° C. when iso-pentane is used; the dew point is 57.08° C. when cyclopentane is used. It can thus be seen that cyclopentane enables the recycle stream to reach the dew point more easily under the same conditions. Therefore, cyclopentane is more suitable to the inlet operation state of the fluidized bed reactor.

Because the molecular structure of cyclopentane differs from that of iso-pentane, the total amount of other condensed α-olefins induced by cyclopentane is 260% of that induced by iso-pentane in the same reactor inlet state and with the same stream composition. So the total amount of liquid in the recycle stream is relatively great and the amount of the removed heat is greater.

To reach the same space-time-yield, the cyclopentane content required in the recycle stream is 20 vol % lower than that of iso-pentane and therefore, the consumption is low, and the down-stream treatment is easier.

Because of the relatively low content of cyclopentane in the recycle stream, the probability of agglomeration of the fluidized bed is greatly reduced under a super-condensed state and the control and regulation of the inlet components are also facilitated.

Cyclopentane has the following advantages over n-hexane:

The molecular weight is lighter than that of n-hexane. The power of the recycle compressor is 22% lower than that when n-hexane is used.

The normal pressure boiling point is lower than that of n-hexane and the difference between the dew point temperature under the inlet state of the reactor and the lowest operation temperature of the reactor is as great as 30.92° C., so the probability of the agglomeration of the resin resulted by the accumulation of the liquid above the distribution plate is greatly reduced.

The potential vaporization heat is 15% greater than that of n-hexane and more heat is removed, and thus the space-time-yield increases by 15% for the same amount of condensing agent.

It is easier to remove in the down stream treatment system at the same space-time-yield, therefore the fixed investment of the degassing and recovery systems is saved and the consumption is low.

Under the same amount of the liquid, the monomers (such as ethylene, co-polymerization monomer) and hydrogen etc. dissolved in cycopentane are about 13% more than those dissolved in n-hexane. Therefore it is easier to atomize after throttle and the plugging probability of the distribution plate is greatly reduced.

The object of the present invention is, therefor, to select cyclopentane with a moderate molecular weight, a boiling point closer to the inlet temperature, a greater potential vaporization heat and more heat removal so as to overcome the intrinsic disadvantages of the presently used condensing agent in the fluidized bed reactor process operated in the condensing mode, thus greatly increasing the space-time yield of the polymer at the same amount of condensing agent. Meanwhile, the concentration of the other components in the recycle gas stream is increased due to the decrease of the amount of the condensing agent, so that the composition of the stream is easy to regulate and also the accidents of the resin sticking and agglomeration are not likely to occur; and the removal and recovery of the condensing agent are easy to be conducted in the subsequent treatment and thereby the energy consumption is reduced.

SUMMARY OF THE INVENTION

The present invention provides a continuous gas phase fluidized bed reactor polymerization process for producing polymers, comprising cooling the recycle stream to below its dew point and recycling the resultant two-phase mixture of the gas and liquid phase to the reactor, the inert condensable agent introduced into the recycle stream being saturated hydrocarbons, characterized in that the saturated hydrocarbon is cyclopentane.

DETAILED DESCRIPTION OF THE INVENTION

The space-time-yield for producing polymers in the reactor can be calculated from the following parameters $$P_E = \frac{F_0 \times \Delta T \times \sum C_p + F_L \times Q}{\Delta H \times V} \quad (1)$$

Where: $P_E$: space-time-yield of the reactor, kg/h·m³

$F_0$: weight flow rate of the recycle stream, kg/h $\Delta T$: difference between the temperature of the bed material and the temperature at the stream inlet, ° C.

$\Sigma C_p$: specific heat of the recycle stream, kcal/kg·° C.

$F_L$: weight flow rate of the liquid stream, kg/h

Q: potential vaporization heat of the liquid stream, kcal/kg $\Delta H$: reaction heat of the polymerization reaction, kcal/kg V: volume of the reactor, m³

It can be seen from (1) that, under the same reaction conditions, increase in either liquid amount $F_L$ or potential vaporization heat Q may increase the space-time-yield. The traditional method was to introduce a certain amount (5–10 vol %) of inert alkanes, such as iso-pentane or n-hexane as condensing agent into the recycle stream, to cool the condensing agent in the recycle stream down to below their dew points trough compression and cooling. The alkane partially turns into liquid and induces the condensation of the other hydrocarbons, and two phases of gas and liquid thus form in the recycle stream and return to the reactor. Because of the great difference between the temperature of the cooled stream and that of the material in the reactor ($\Delta T$ is generally in the range of 30–70° C.), the liquid stream evaporates abruptly and adsorbs the heat of the polymerization reaction and thereby the heat removal from the reactor is increased and the space-time-yield rises. Traditionally, iso-pentane or n-hexane is selected as the condensing agent, but iso-pentane or n-hexane has the following disadvantages in practical application:

To acquire a desired space-time-yield, the concentration in recycle stream should be generally higher than 8 vol % when iso-pentane is used as the condensing agent because of its relatively low boiling point (27.9° C.) and low potential vaporization heat (70.7 kcal/kg at 80° C.) under normal pressure.

Because of the higher concentration of iso-pentane in the recycle stream, the control of the concentration and proportion of the reactants is difficult. In order to retain the required concentration, the effluent of the recycle stream will be more than 100 Nm³/h, resulting in a great loss.

When n-hexane is used as the condensing agent, because of its relatively high boiling point at the normal pressure (68.7° C.) and relatively heavy molecular weight (68.1), an effect value of the axial temperature distribution $T_Z>0.8$ is resulted if the concentration in the recycle stream exceeds 6 vol % and the content of the liquid exceeds 20 wt % after condensation. At that time, the stability of the reactor is seriously deteriorated and accidents like resin sticking etc. would occur, and as a result, the production has to be stopped for a treatment.

When n-hexane is used, according to the Henry's Law, the weight fraction of the gas adsorbed in the polyethylene resin is:

$$W_i = \frac{X_i \cdot P \cdot (f/\rho)_i}{H_i} \quad (2)$$

Where $W_i$: weight fraction $X_i$: concentration of hexane in the recycle stream P: total pressure $(f/\rho)_i$: effective coefficient $H_i$: Henry's constant of hexane Because the $H_i$ of hexane is relatively small and the amount adsorbed in the resin is great, it is hard to desorb in the down stream system and the amount of nitrogen required for purging is about 50% greater than that when no hexane is present and thus more nitrogen consumes.

When n-hexane is used, the power consumed by the recycle compressor is increased by about 10%, and thus the energy consumption is increased.

Through many times of comparative experiments, among inert hydrocarbons, cyclopentane is preferred in this invention as the condensing agent. It is more suitable to the condensing mode operation of the fluidized bed reactor. Cyclopentane has the following advantages over iso-pentane or n-hexane:

The molecular weight approximates that of iso-pentane, but the potential vaporization heat at 80° C. is 87 kcal/kg, 25% greater than that of iso-pentane. It is known from the functional correlation $P_E$ $F_L Q$ that the space-time-yield $P_E$ may increase by about 25% at the same liquid amount $F_L$.

The boiling point is 46° C., which is more suitable to the operation under the inlet state of the reactor. Under the same conditions, the dew point of the recycle stream appears at the position about ⅓ from the outlet end of the cooler (fixed plate type), i.e., the "slurry" zone is closer to the outlet of the cooler, so the resistance drop is small, and plugging is not likely to occur. The difference between the dew point and the temperature of the reactant is greater, so the evaporation and distribution are easier, and the sticking of the resin is not likely to occur.

To achieve the same space-time-yield, the concentration required in the recycle stream is about 20 vol % lower than that of iso-pentane, which facilitates the control of the reactant components and the effluent of recycle stream is 30% less than that when iso-pentane is used. This results in a less loss and a lower recovery cost.

The specific gravity is smaller than that of n-hexane and the power of the recycle stream compressor is about 22% lower than that when n-hexane is used under the same operation conditions. So energy is saved.

The potential vaporization heat Q is 87 kcal/kg, about 15% higher than that of n-hexane. It is known from the functional correlation $P_E$ $F_L Q$ that the space-time-yield of the reactor $P_E$ is about 15% higher at the same liquid amount $F_L$.

Because the Henry's constant $H_i$ of cyclopentane is greater than that of n-hexane, the gas phase weight fraction dissolved in the polyethylene resin is smaller and it is easier to desorb in the down stream system. The amount of nitrogen used for purging is about 50% less than in case of hexane and thus the consumption is low.

The best choice is to use cyclopentane as an inert condensing agent, which can be used in the production unit for producing polymers such as polyethylene, polypropylene, with a fluidized bed reactor as elementary unit. The present invention is not restricted to any particular polymerization reaction, but it especially suites the polymerization reactions of ethylene, propylene, butene-1, pentene-1, 4-methyl pentene-1, hexene-1, octene-1 and styrene as well as dienes.

The catalyst used in the present invention includes coordinated anionic catalysts, cationic catalysts, free-radical catalysts, and includes transition metal components or metallocenes, as well as double peak product catalysts.

The process of the present invention is not limited to the production of polyolefins, it can also be used to perform any exothermic reaction, in particular, to perform exothermic polymerization reactions operated in the condensing mode.

The present invention can be used not only in a newly designed fluidized bed polymerization reactor, but also in the reconstruction of a fluidized bed reactor under operation for an enlarged capacity.

The recycle stream of the process of the present invention enters the inlet means at the bottom of the reactor, preferably a flow deflector, which consists of homocentric annular plate and conic plate and provides at least three paths for the gas stream to enter the reactor. This flow deflector is a major inventive point of another jointly owned and co-pending application No. 99118186. 7 with the present invention. The whole text of the application has been incorporated herein by reference.

EXAMPLE 1

A Unipol fluidized bed unit for producing polyethylene imported from UCC of U.S.A was used to carry out the operation in the condensing mode. Cyclopentane was used as the condensing agent. See Table 1 for the run data on the process parameter, stream composition and space-time-yield over a 12 hour period.

COMPARATIVE EXAMPLES 1 AND 2

The test unit was the same as in Example 1 except for that iso-pentane and n-hexane were used as the condensing agents respectively. The results compared to Example 1 are shown in Table 2.

TABLE 1

| | DGM-1820 Run data | | | | | | |
|---|---|---|---|---|---|---|---|
| Time | 12:00 | 14:00 | 16:00 | 18:00 | 20:00 | 22:00 | 24:00 |
| Composition of recycle stream | | | | | | | |
| Ethylene % | 46.0 | 46.2 | 45.7 | 45.5 | 44.9 | 45.2 | 46.1 |
| Butene-1% | 18.4 | 18.48 | 18.28 | 18.2 | 17.96 | 18.08 | 14.44 |
| Hydrogen % | 9.2 | 9.24 | 9.14 | 9.15 | 8.98 | 9.04 | 9.22 |
| Cyclopentane % | 4.0 | 5.4 | 4.4 | 4.2 | 3.8 | 3.7 | 4.0 |
| Nitrogen % | 20.6 | 18.88 | 20.78 | 22.23 | 22.76 | 22.48 | 20.72 |
| Ethane % | 1.8 | 1.8 | 1.7 | 1.72 | 1.6 | 1.5 | 1.57 |
| Dew point of recycle gas ° C. | 59.7 | 66.0 | 61.5 | 60.46 | 58.24 | 57.88 | 59.75 |
| Temperature of reactor inlet ° C. | 52.3 | 49.5 | 46.2 | 45.7 | 48.5 | 48.8 | 47.6 |
| Liquid in recycle gas wt % | 6.1 | 14.3 | 12.8 | 12.3 | 7.9 | 7.4 | 10.2 |
| Reactor temperature ° C. | 88.1 | 87.5 | 87.7 | 88.1 | 87.9 | 87.6 | 88.2 |
| Reactor pressure | 2400.5 | 2410.7 | 2400.3 | 2360.8 | 2369.8 | 2361.5 | 2655.3 |

TABLE 1-continued

DGM-1820 Run data

| Time | 12:00 | 14:00 | 16:00 | 18:00 | 20:00 | 22:00 | 24:00 |
|---|---|---|---|---|---|---|---|
| kPa |  |  |  |  |  |  |  |
| Gas flow in reactor m/s | 0.76 | 0.77 | 0.74 | 0.73 | 0.73 | 0.72 | 0.71 |
| Height of reactor bed m | 12.8 | 13.0 | 12.7 | 12.6 | 12.7 | 12.9 | 13.1 |
| Bulk density of resin kg/m$^3$ | 340.1 | 339.7 | 339.8 | 338.9 | 340.2 | 341.6 | 340.7 |
| Fluidization density of resin kg/m$^3$ | 230.2 | 226.7 | 220.1 | 228.7 | 229.7 | 230.7 | 232.0 |
| Space-time-yield kg/h · m$^3$ | 155.8 | 207.5 | 209.1 | 207.8 | 175.2 | 171.8 | 190.9 |
| Enthalpy change of recycle stream cal/g | 22.1 | 29.4 | 29.6 | 29.45 | 24.8 | 24.35 | 27.1 |
| Reactor size |  |  |  |  |  |  |  |
| Diameter m | 3.05 | 3.05 | 3.05 | 3.05 | 3.05 | 3.05 | 3.05 |
| Height of cylindrical section m | 12.0 | 12.0 | 12.0 | 12.0 | 12.0 | 12.0 | 12.0 |
| Flow deflector | modified | modified | modified | modified | modified | modified | modified |
| Physical properties of product |  |  |  |  |  |  |  |
| MI g/10 min | 1.98 | 2.01 | 2.02 | 2.10 | 2.09 | 1.99 | 1.98 |
| DE g/cc | 0.919 | 0.920 | 0.920 | 0.919 | 0.918 | 0.918 | 0.919 |
| Consumption of material kg/kg | 1.022 | 1.021 | 1.022 | 1.020 | 1.020 | 1.019 | 1.021 |

TABLE 2

DGM-1820 Run data using different condensing agent

|  | Example 1 | Comparative example 1 | Comparative example 2 |
|---|---|---|---|
| Composition of recycle stream % |  |  |  |
| Ethylene | 40.5 | 40 | 39.5 |
| Butene-1 | 16.0 | 16.0 | 16.2 |
| Hydrogen | 8.5 | 8.0 | 8.2 |
| Iso-pentane | / | 4.0 | / |
| Cyclopentane | 4.0 | / | / |
| n-hexane | / | / | 4.0 |
| Ethane | 1.0 | 1.0 | 1.10 |
| Nitrogen | 30 | 31.0 | 31.0 |
| Catalyst type | α | α | α |
| Dew point of recycle stream °C. | 57.08 | 47.09 | 70.13 |
| Temperature of reactor inlet °C. | 44.2 | 43.9 | 50.2 |
| Liquid in recycle stream wt % | 9.8 | 3.0 | 12.1 |
| Reactor temperature °C. | 87.9 | 88.06 | 88.1 |
| Reactor pressure kPa | 2.41 | 2.40 | 2.39 |
| Superficial velocity in reactor m/s | 0.77 | 0.76 | 0.76 |
| Height of reactor bed m | 12.6 | 12.4 | 12.0 |
| Bulk density of resin kg/m$^3$ | 340.1 | 342.0 | 351.0 |
| Fluidization density of resin kg/m$^3$ | 240.2 | 239.1 | 238.9 |
| Space-time-yield kg/h · m$^3$ | 191.1 | 159.6 | 188.3 |
| Enthalpy change of recycle stream cal/g | 27.3 | 22.6 | 31.3 |
| Physical properties of product |  |  |  |
| Melting index MI g/10 min | 1.88 | 2.0 | 1.97 |
| Density DE g/cc | 0.919 | 0.920 | 0.918 |
| Consumption of material kg/kg | 1.022 | 1.023 | 1.023 |
| Compressor power kW | 1008 | 980 | 1120 |
| Consumption of condensing agent kg/kgPE | 0.00625 | 0.00786 | 0.00623 |
| Reactor size |  |  |  |
| Diameter m | 3.05 | 3.05 | 3.05 |
| Height of cylindrical section m | 12.0 | 12.0 | 12.0 |
| Flow deflector | modified | modified | modified |

What is claimed is:

1. A polymerization process for producing polymers in a continuous gas phase fluidized bed reactor, said process comprising the steps of:
   cooling a recycle stream to below its dew point and recycling a resultant two-phase stream mixture of a gas and a liquid phase to the reactor,
   introducing an inert condensable agent into the recycle stream to raise the dew point, said inert condensable agent being a saturated hydrocarbon, and
   wherein the saturated hydrocarbon is cyclopentane.

* * * * *

UNITED STATES PATENT AND TRADEMARK OFFICE
CERTIFICATE OF CORRECTION

PATENT NO.    : 6,262,192 B1
DATED         : July 17, 2001
INVENTOR(S)   : Wu, Wenqing It is certified that error appears in the above-identified patent and that said Letters Patent is hereby corrected as shown below:

Column 3,
Line 60, replace "$\Sigma$" with -- $\Sigma$ --

Column 5,
Lines 13 and 37, replace "$P_c \ F_L Q$" with -- $P_c \propto F_L Q$ --

Signed and Sealed this

Second Day of April, 2002

*Attest:*

JAMES E. ROGAN
*Attesting Officer*  *Director of the United States Patent and Trademark Office*